Figure 1:
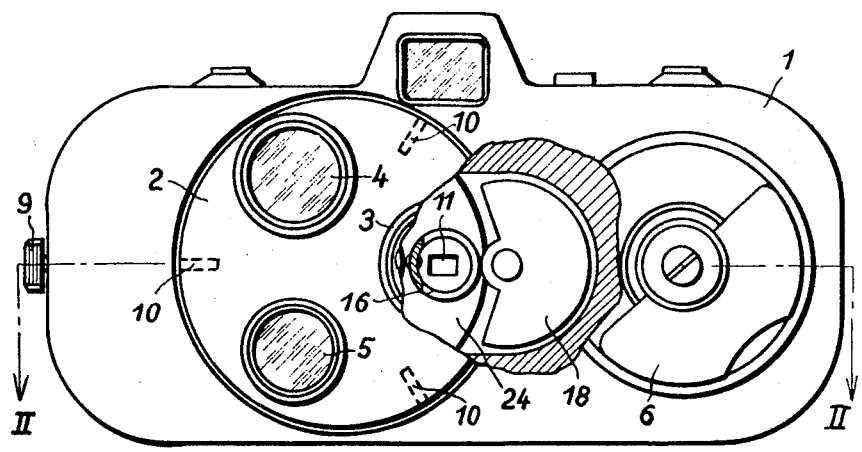

Sept. 18, 1962      H. KUPPENBENDER ET AL      3,054,324
PHOTOGRAPHIC CAMERAS, PARTICULARLY MOTION PICTURE
CAMERAS PROVIDED WITH EXCHANGEABLE OBJECTIVES
Filed June 20, 1960                              4 Sheets-Sheet 1

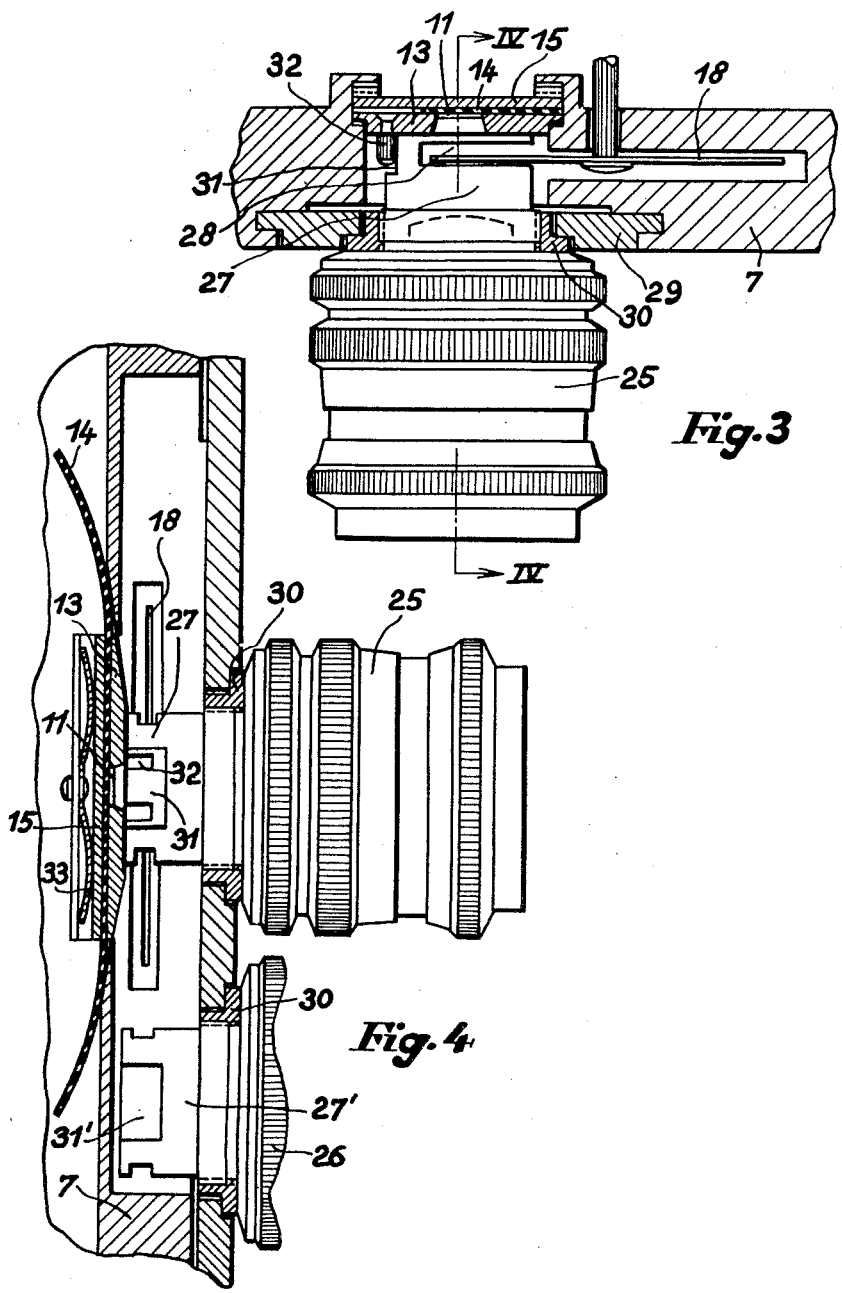

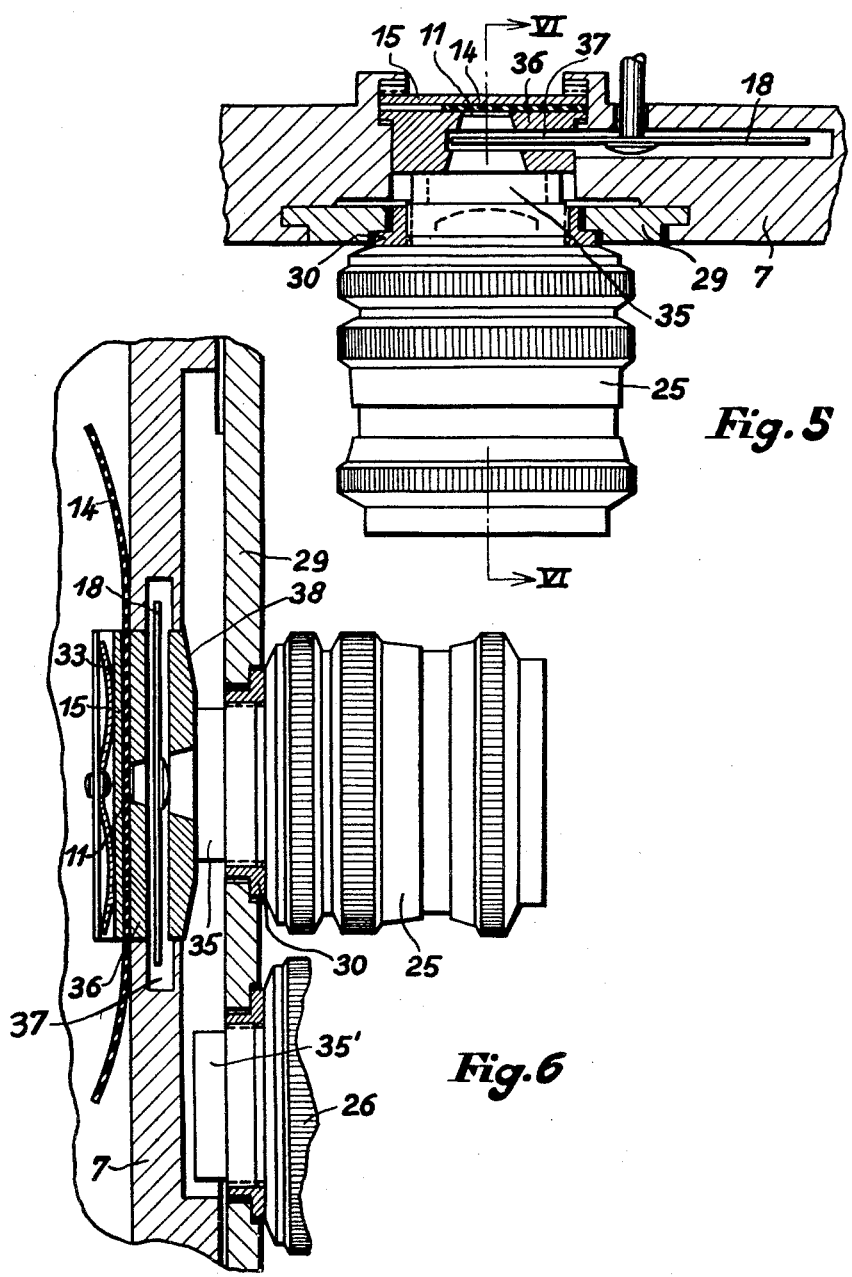

United States Patent Office 3,054,324
Patented Sept. 18, 1962

3,054,324
PHOTOGRAPHIC CAMERAS, PARTICULARLY MOTION PICTURE CAMERAS PROVIDED WITH EXCHANGEABLE OBJECTIVES
Heinz Kuppenbender, Heidenheim (Brenz), Otto Erbe, Aalen, Wurttemberg, and Christian Ludwig, Oberkochen, Wurttemberg, Germany, assignors to Carl Zeiss, Oberkochen, Wurttemberg, Germany
Filed June 20, 1960, Ser. No. 37,169
Claims priority, application Germany July 3, 1959
3 Claims. (Cl. 88—16)

The present invention relates to improvements in photographic cameras, particularly motion picture cameras provided with exchangeable objectives.

In cameras of this type, particularly when the same are equipped with high power objectives, it is difficult to fulfill the high demands for a correct positioning of the objective relative to the plane of the film. In case the objective is rigidly built into the camera, a sufficiently accurate adjustment can be made during the assembly of the camera. If, however, a small film camera has to be equipped with exchangeable objectives, the sum of different tolerances, which are generally permissible in manufacturing of cameras, is such that it can no longer be tolerated when high power objectives are to be used. This is particularly the case when due to the manufacturing tolerances the distance between the back lens apex of the objective and the plane of the film does not exactly correspond to the focal length of the objective.

The object of the present invention is to provide an accurate adjustment of each of the exchangeable objectives with respect to the plane of the film in a photographic camera, particularly a motion picture camera. This is obtained, according to the present invention, by providing the end of the objective which faces the camera with a sleeve of such a length that the distance between the back lens apex of the objective and the end of the sleeve corresponds to the difference between said intercepted length and the thickness of the film supporting plate disposed in the camera and containing the picture window. Furthermore, a movable spring-support is provided for mutual abutment of the objective sleeve and/or film supporting plate, acting in axial direction. It is particularly advantageous to provide the film supporting plate in the camera with a predetermined thickness. This type of plate can be easily manufactured to very close tolerances, so that the exact adjustment of the position of the picture plane relative to the plane of the film in the new camera can be reduced to a single final manufacturing step of the objective.

In the small film cameras a rotary shutter disc is disposed between the objective and the plane of the film. To prevent any obstruction during the exchange of the objective by said shutter, the plate which is arranged in the body of the camera is preferably provided with a slot for passage of said rotary shutter. This plate is preferably designed in such a manner that it forms together with the film supporting plate a unit which is yieldably supported in axial direction.

In case the camera is provided with a rotary objective turret or an interchangeable slide plate, the objective sleeve is preferably provided with a slot for the passage of said rotary shutter disc, but in this case it will be necessary to provide means which will lock the respective objective, which is in its operative position, in this position.

When it is desired to rigidly support said plate in the body of the camera, it will be necessary to provide a spring exerting a pressure in axial direction towards the plane of the film. In such case it is advantageous to provide a lever actuated during the exchange of an objective, which lever will elevate the element, which carries the exchangeable objectives, in axial direction from a stop in the body of the camera against the action of said spring before initiating the actual movement for the exchange of the objectives.

Figure 2:
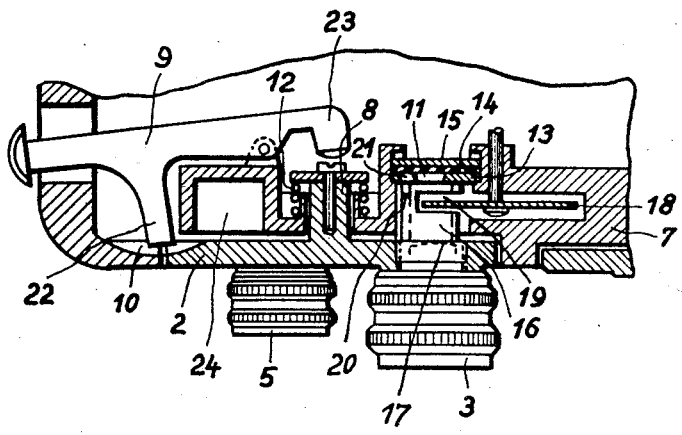
Figure 7:
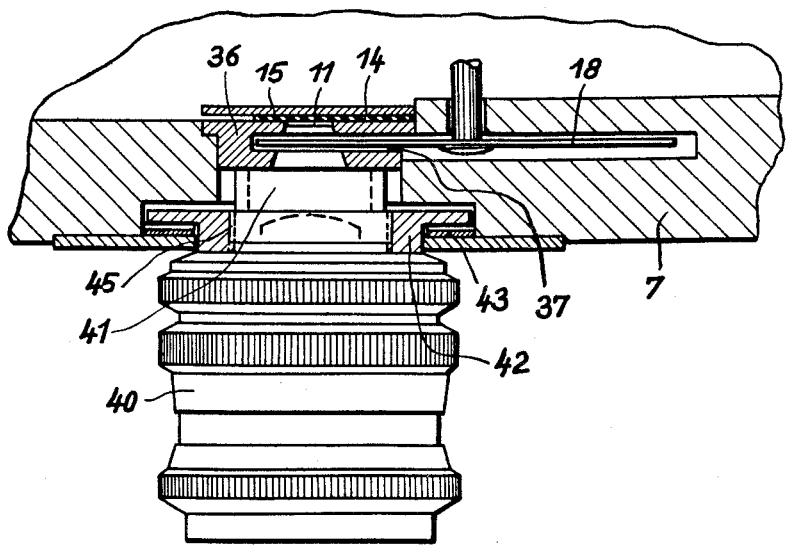

The present invention will now be described in detail on hand of the accompanying drawings, in which:

FIG. 1 shows the front view of a partially broken-away motion picture camera with rotary turret for the objectives in accordance with the present invention, FIG. 2 shows a sectional view along the line II—II of FIG. 1, FIG. 3 shows a partial view of a horizontal section of a motion picture camera provided with a slidable carrier for exchangeable objectives, FIG. 4 shows a sectional view along the line IV—IV of FIG. 3, FIG. 5 shows a partial view of a horizontal section of a further embodiment of a motion picture camera with exchangeable objectives on a slidable carrier plate, FIG. 6 shows a section along the line VI—VI of FIG. 5, and FIG. 7 shows a partial view of a horizontal section of a motion picture camera with an exchangeable objective mounting according to the present invention.

In FIG. 1 the motion picture camera 1 is provided with a rotary turret 2. This turret 2 carries the objectives 3, 4 and 5. A manually operable handle 6 is used for winding the spring motor of the camera.

As shown in FIG. 2 the objective turret 2 is arranged in the housing 7 of the camera and is rotatable about an axis 8. A detent lever 9 cooperating with grooves 10 is provided for locking the selected objective in its position relative to the picture window 11. A pressure spring 12 urges the turret 2 at all times against the camera housing 7.

A film supporting plate 13 is rigidly mounted in the camera housing 7. The thickness of this plate 13 is made with the highest degree of accuracy to be of a predetermined magnitude=$d_1$. This plate 13 is provided with the picture window 11. The film 14 is pressed in known manner by a film pressure plate 15 against the film supporting plate 13.

The objective 3 is provided with a rearwardly extending sleeve 16, the length $d_2$ of which is equal to the difference between the intercepted length $s'$ of the objective and the thickness $d_1$ of the plate 13. The objective sleeve 16 is at all times pressed by the spring 12 against the film supporting plate 13. The arrangement being such to maintain a constant distance between the schematically indicated rear lens apex 17 of the objective 3 and the plane of the film 14, which distance corresponds exactly to the focal length $s'$ of the objective.

The sleeve 16 is provided with a slot 19 for passage of the rotary shutter disc 18. The sleeve 16 is also provided with an axial slot 20 into which enters a pin 21 which is connected to the plate 13 when the objective is in its operative position. The objective 3 is locked in its operative position by this pin 21, i.e. the objective cannot be exchanged. Only the objectives 4 and 5, which are in their inoperative position, can be exchanged.

The exchange of the objectives is effected as follows: The detent lever 9 is first pressed backwardly. A lateral arm 22 of the lever will slide out of the groove 10. At the same time the innermost end 23 of the lever 9 will press the objective turret 2 in forward axial direction against the action of the pressure spring 12. This will move the objective 3 forwardly to such an extent that the pin 21 will slide out of the slot 20 in the sleeve 16. The objective turret 2 can now be rotated so that the sleeve 16 will move into an annular groove 24. During the turning, the revolving turret 2 cannot drop, because the the arm 22 of the lever 9 cannot return to its initial position. Only after another objective has been moved in front of the picture window 11, the arm 22 can engage another groove 10 and the turning action is terminated.

The rotary shutter 18, which covers the picture window 11 during the standstill of the spring motor, moves into the slot 19 of the sleeve 16 and thus cannot obstruct the turning of the turret.

When the turning of the turret is terminated, the end 23 of the detent lever 9 will disengage the objective turret, and same is moved axially rearwardly by the spring 12 until the sleeve of the objective which is now in its operative position will abut the film supporting plate. During this operation the pin 21 will enter into the respective groove of the sleeve and the new objective will thus be locked in its position.

The motion picture camera shown in partial section in FIGS. 3 and 4 is provided with a slidable plate 29 carrying exchangeable objectives. This plate 29 is disposed in the camera housing 7 and is provided with annular inserts 30 for receiving the exchangeable objectives 25 and 26.

The film supporting plate 13 arranged in the camera housing 7 has a thickness which corresponds to a value equal to $d_1$. The plate 13 is provided with the picture window 11 and is used for support of the film 14. This film is pressed in known manner by a film pressure plate 15 against the plate 13. In the embodiment shown in FIGS. 3 and 4 the plate 13 forms together with the film pressure plate 15 a unit which at all times is pressed by a spring 33 in the direction of the objective 25. There is also a possibility of designing the camera in such a manner that the spring 33 acts only on the film supporting plate 13 and presses the latter against the sleeve 27 of the objective. In such a case the film 14 will be pressed by the yieldably supported film pressure plate 15 against the plate 13.

In these FIGS. 3 and 4 each one of the objectives 25 and 26 is provided with a sleeve 27 the length of which is $d_2 = s' - d_1$. The plates 13 and 15 are pressed by the spring 33 forwardly until the plate 13 engages the end of the sleeve 27.

The sleeve 27 is provided with a lateral slot 28 for the passage of the rotary shutter disc 18. The sleeve 27 is also provided with a flat face 31 against which bear two pins 32 when the objective is in operative position. These pins 32 lock the objective in its operative position. Only those objectives, which are not in their operative position, can be exchanged, i.e. removed from the slidable carrier plate 29.

The exchange of the objectives is effected in the following manner: When the slidable carrier plate 29 is shifted upwardly, the flat face 31 on the sleeve 27 will slide past the pins 32. An obstruction during this exchange operation by the rotary shutter 18 is impossible, because the latter moves in each respective position in the slot 28 of the sleeve 27. After the release by said sleeve 27 the plate 13 will be pressed by the spring 33 together with the plate 15 in a forward direction until the sleeve of the next objective 26 moves over same and will press the plates into their initial position. When this takes place, the flat face 31' of the next sleeve 27', which is connected with the objective 26, will bear against the pins 32 so that a removal of the objective 26 from the carrier 29, which is now disposed in front of the picture window 11, is no longer possible.

The objective is locked in its position by a latch provided on the slidable carrier plate 29.

The FIGS. 5 and 6 show in partial section a motion picture camera which is also provided with a slidable carrier plate 29 on which the objectives are mounted. In difference to the motion picture camera shown in FIGS. 3 and 4, the present motion picture camera is provided with a film supporting plate 36 which is of greater thickness than the plate in the camera shown in FIGS. 3 and 4. This plate 36 is also provided with a picture window 11 and with a slot 37 for accommodating the rotary shutter disc 18.

The objectives 25 and 26 are provided with rearwardly extending sleeves 35 and 35', the length $d_2$ of which is again equal to the difference between the intercepted length $s'$ of the objective and the thickness $d_1$ of the plate 36.

In the present embodiment the plate 36 forms together with the film pressure plate 15 a unit which guides the film 14 and is pressed by the spring 33 in the direction of the objective. The objective 25 in front of the picture window 11 serves with its sleeve 35 as abutment for the plate 36.

The exchange of the objectives is as follows: When the slidable carrier plate 29 is shifted upwardly, the sleeve 35 of the objective 25 will slide over the inclined faces 38 of the plate 36 and away from the range of the picture window 11. An obstruction of the exchange operation by the rotary shutter disc 18 is impossible, because said shutter disc 18 moves in the slot 37 of the plate 36. The plate 36 together with film pressure plate 15 is pressed by the spring 33 after release by the sleeve 35 in a forward direction until the sleeve 35' of the next objective 26 moves over same and presses these plates into their initial position.

Since in this last described embodiment the rotary shutter disc 18 is always moved in the slot 37 of the plate 36, an exchange of the objective which is in its operative position is possible. Therefore, the devices for locking the objective in its operative position are omitted.

It is obvious that the motion picture camera shown in FIGS. 1 and 2 can be modified in such a manner that the obstruction of the objective change of the revolving means for the objectives provided on said camera can be eliminated. For this purpose it is only necessary to make the film supporting plate 13 of such a thickness that the rotary shutter disc 18 can move in a suitable slot provided in this plate. When the plate 15 is furthermore made yieldable in axial direction and is provided with inclined surfaces (such as, for instance, the surfaces 38 in FIG. 6), the yieldable support of the rotary turret 2 with the objectives thereon as shown in FIG. 2 can be eliminated. In such a case the objective turret 2 is rigidly mounted to prevent any movement in axial direction so that the detent lever 9 is only used for locking the turret in its desired rotational positions.

FIG. 7 shows a partial section of a motion picture camera with an exchangeable objective mounting. An objective receiving plate 42 is arranged in the camera housing 7 and is pressed by a leaf spring 43 in the direction of the plane of the film 14. The objective receiving plate 42 is provided with any suitable means 45, such as a threaded bore or a bayonet lock, for receiving the objective.

The plate 36 which is used for supporting the film is also in this case provided with a slot 37 for passage of the rotary shutter disc 18. In this particular case the plate 36 is fixedly attached to the camera housing 7.

The objective 40 is provided with a sleeve 41, the length $d_2$ of which corresponds to the difference between the intercepted lenth $s'$ of the objective and the thickness $d_1$ of the plate 36. The objective 40 together with the objective receiving plate 42 is pressed by the spring 43 in the direction of the plane of the film 14 until the sleeve 41 abuts the film supporting plate 36. An obstruction to the exchange of the objective is not possible because the rotary shutter disc 18 rotates in the slot 37 of the plate 36 about an axis parallel to the optical axis of the camera objective.

In principle it is possible to make the thickness of the film supporting plate equal to zero, i.e. to design the end of the objective barrel to be acting directly as a film supporting means. In such a case it would be necessary to provide the end of the barrel with a picture window, but it is also necessary that this picture window occupies exactly the same position after an exchange of the objective in which the picture window was positioned when the previous objective was used. This requirement, however, causes certain production difficulties so that the embodiments shown in the FIGS. 1 to 7 are much to be perferred.

What we claim is:

1. In a photographic camera, such as a motion picture camera equipped for use with a plurality of exchangeable objectives, a camera housing, a film supporting plate with a picture window mounted in said housing, said film supporting plate being provided with a slot between its two faces and arranged parallel to said faces, a rotary shutter disc in said housing extending into said slot and adapted to cover and uncover said picture window in said film supporting plate, a camera objective adapted to be exchangeably mounted on the front of said camera housing, said camera objective being provided at the end facing the camera housing with a sleeve extending into said camera housing, said sleeve being of such a length that the distance between the back lens apex of the objective and the outer end of the sleeve is equal to the difference between the back focus of the objective and the thickness of said film supporting plate, and a pressure plate yieldable in axial direction of said objective causing an abutment of said film supporting plate against the end of said sleeve.

2. In a photographic camera, such as a motion picture camera equipped for use with a plurality of exchangeable objectives, a camera housing, a film supporting plate with a picture window mounted in said housing, a camera objective adapted to be exchangeably mounted on the front of said camera housing, said camera objective being provided at the end facing the camera housing with a sleeve extending into said camera housing, said sleeve being of such a length that the distance between the back lens apex of the objective and the outer end of the sleeve is equal to the difference between the back focus of the objective and the thickness of said film supporting plate, and a pressure plate yieldable in axial direction of said objective causing an abutment of said film supporting plate against the end of said sleeve, said sleeve on said objective being provided with a slot extending transversely to the optical axis of said camera, and a rotary shutter disc in said housing extending into said slot and adapted to cover and uncover said picture window in said film supporting plate.

3. A photographic camera according to claim 2, including a movably adjustable carrier for a plurality of objectives and means for locking each of said objectives in their operative position, said means including a pivotally mounted lever adapted to be manually operated when an objective is to be exchanged, and means operated by said lever prior to initiating an exchange of said objective for axially shifting said objective away from its abutting engagement with said film supporting plate.

References Cited in the file of this patent

UNITED STATES PATENTS

| 2,104,094 | Nerwin | Jan. 4, 1938 |
| 2,369,981 | Reyniers | Feb. 2, 1945 |

FOREIGN PATENTS

| 511,828 | Great Britain | Aug. 24, 1939 |
| 1,194,673 | France | May 11, 1959 |